(12) United States Patent
Roessler

(10) Patent No.: US 6,369,395 B1
(45) Date of Patent: Apr. 9, 2002

(54) PHOSPHORESCENT VEHICLE TRUNK RELEASE

(75) Inventor: David Martyn Roessler, Hazel Park, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/635,586

(22) Filed: Aug. 9, 2000

(51) Int. Cl.$^7$ .............................................. E05B 63/20
(52) U.S. Cl. ................. 250/462.1; 292/336.2; 362/501
(58) Field of Search .................. 250/462.1; 292/336.3, 292/347, 76; 362/501, 100, 540

(56) References Cited

U.S. PATENT DOCUMENTS

| | | | |
|---|---|---|---|
| 5,445,326 A | 8/1995 | Ferro et al. ................. 292/336 |
| 5,711,559 A | 1/1998 | Davis ......................... 292/340 |
| 6,086,131 A | * 7/2000 | Bingle et al. ................. 296/76 |
| 6,135,514 A | * 10/2000 | Kowalewski et al. ....... 292/216 |
| 6,209,933 B1 | * 4/2001 | Ang et al. ............... 292/336.3 |
| 6,222,442 B1 | * 4/2001 | Gager et al. ................ 340/426 |
| 6,254,261 B1 | * 7/2001 | Bingle et al. ............... 362/501 |

* cited by examiner

Primary Examiner—Constantine Hannaher
Assistant Examiner—Otilia Gabor
(74) Attorney, Agent, or Firm—George A. Grove; Jeffrey A. Sedlar

(57) ABSTRACT

A release mechanism is located within a vehicle trunk for releasing the trunk lid. The mechanism includes a handle coated with a phosphorescent material to allow the handle to be viewed within a darkened trunk. The phosphorescent material is excited or made to glow by external light conducted through light-conducting means. The light-conducting means extends between a location external to the vehicle and a point adjacent the handle. The handle glows for a period of time following the exposure to the external light entering the conducting means to allow visibility of the handle within a darkened trunk.

13 Claims, 3 Drawing Sheets

PHOSPHORESCENT VEHICLE TRUNK RELEASE

TECHNICAL FIELD

This invention relates to a release mechanism for a trunk lid of a vehicle and, more particularly, to a release mechanism that has a handle coated with a phosphorescent material that is energized without opening of the trunk lid or the use of electrical power.

BACKGROUND OF THE INVENTION

It is known in the art of vehicle compartment latches to provide a release handle in the interior of an automotive trunk to allow an individual to escape from a closed trunk. Although these handles can be fitted to the interior of the trunk, the trapped individual must also be able to see and operate the handle. The handle may be illuminated by a light bulb, LEDs, or similar sources. However, these configurations all require electrical power and are not always reliable. For example, bulbs may burn out and wiring may become defective.

Radioluminescent materials could provide the requisite visibility of the release handle without requiring electrical power, but such materials pose environmental concerns. Recent developments in luminescence have led to a class of phosphors that have sufficient brightness and long-lived afterglow to provide the required visibility. A problem associated with this type of material is that the initial excitation is usually only from light entering the trunk during times when the trunk lid is opened or from the illumination of a light bulb normally incorporated in a trunk. If the trunk is entered at night and/or there is inadequate trunk lighting, such as no light bulb or inadequate intensity, the phosphor may not provide the requisite visibility for a suitable period, such as an hour. Further, an individual may enter the trunk via the rear passenger seat in which case the trunk lid is not opened and the trunk light is not turned on, resulting in the phosphor not being excited to provide the requisite visibility. Further, some trapped victims may be too young to read directions or interpret signs regarding the operation of the trunk release. In such instances, the trunk release might be bright enough for visibility but might not be attractive enough to young children to encourage them to reach for the handle.

SUMMARY OF THE INVENTION

The present invention provides a release mechanism for releasing a trunk lid of a vehicle from within the trunk. The mechanism includes a handle coated with a phosphorescent material to allow the handle to be viewed within a darkened trunk. The phosphorescent material is excited or made to glow by external light conducted through light-conducting means. The light-conducting means extends between a location external to the vehicle and a point adjacent the handle. The handle glows for a period of time following exposure to the external light entering the conducting means to allow visibility of the handle within a darkened trunk.

The light-conducting means may include a window disposed within a trunk wall such as the trunk lid. The window is preferably located such that the external light passes through the window and shines directly on the phosphorescent material. The window may have a circular, rectangular or other acceptable shape. The window may be made from a glass or a plastic material. The glass or plastic material transmits light within the blue part of the visible spectrum. Ideally, the glass or plastic material transmits light having a wavelength including the range from 200–450 nanometers. The size of the glass or plastic is at least one square centimeter.

In another embodiment of the present invention, the light-conducting means may include a window and a light pipe or fiber bundle extending from the window to a point adjacent the handle to conduct external light from the window to a location adjacent the phosphorescent material. The window may be an existing window of the vehicle such as the back window or one of the side windows. By adding a window to the vehicle or using an existing window of the vehicle to allow the external light to excite the phosphorescent material, the handle is visible within a darkened trunk without having to open the trunk lid or provide electrical power.

The phosphorescent material preferably contains at least two different types of phosphors. One of the phosphorescent materials should have a long decay time, such as does alkaline-earth oxide aluminate material. This type of material provides a more lasting glow than a material based on zinc sulfide, which may be brighter but fades more quickly. The different types of phosphor may be combined to form a certain pattern when it is excited that encourages children to reach for the handle, for example, the shape of an ice cream cone.

These and other features and advantages of the invention will be more fully understood from the following description of certain specific embodiments of the invention taken together with the accompanying drawings.

DESCRIPTION OF THE PREFERRED EMBODIMENT

Figure 1:
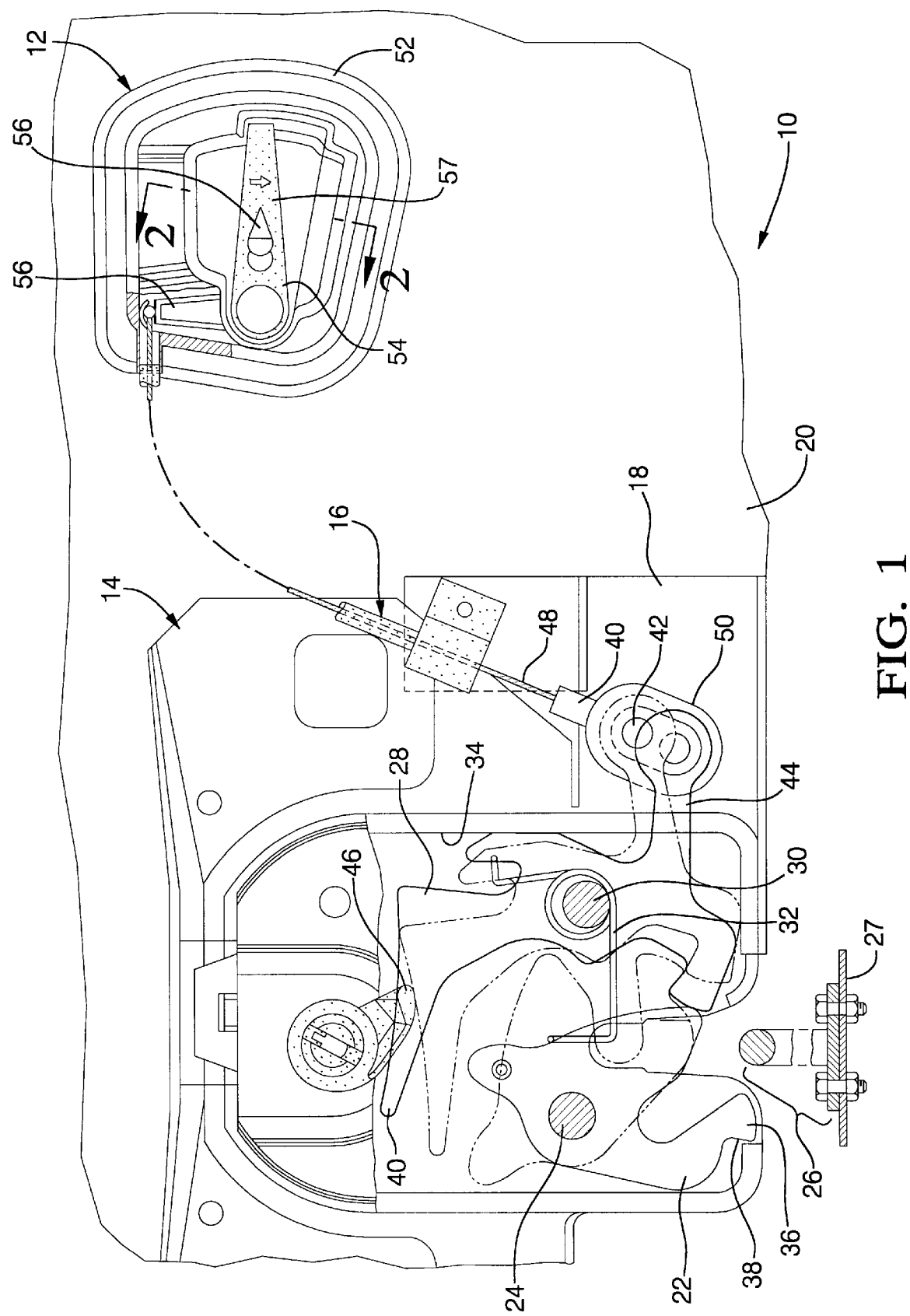
FIG. 1 is an interior view of a trunk lid latch and release mechanism including a latch and a handle assembly in accordance with the present invention.

Referring now to FIG. 1 of the drawings in detail, numeral 10 generally indicates a latch and release mechanism including a release mechanism 12 for releasing a trunk lid of an automobile from within the trunk, a latch mechanism 14 for securing the trunk lid in a closed position and a pull cable 16 extending between the latch mechanism 14 and the release mechanism 10. The latch mechanism 14 includes a housing or support 18 that is adapted for fastening to a trunk lid 20 and a fork bolt 22 that pivots on the support 18 about a pivot pin 24 between an open or unlatched position shown in solid lines in FIG. 1 and a closed or latched position shown in dashed lines in FIG. 1. The latch mechanism 14 is attached to the trunk lid 20 so that the fork bolt 22 is moved from the open position to the closed position when the trunk lid 20 is closed and the fork bolt 22 engages a striker 26 that is attached to the vehicle body 27 at the trunk lid opening, not shown. The cooperation of a fork bolt and a striker is well known and need not be described in detail.

The latch mechanism 14 further comprises a detent lever 28 that pivots on the support 18 about a pivot pin 30. Lever 28 cooperates with the fork bolt 22 in a well-known manner to retain the fork bolt 22 in the closed position shown in dashed lines in FIG. 1 or to release the fork bolt 22 for return to the open position shown in solid lines in FIG. 1. The fork bolt 22 is spring biased clockwise to the open position by a coil spring 32 that surrounds the pivot pin 30 with an extension at one end engaging the fork bolt 22. An extension at the other end of the coil spring 32 engages the detent lever 28 so that the detent lever 28 is also spring biased clockwise by the coil spring 32 against an abutment 34 of the support 18 to the detent position shown in dashed lines in FIG. 1. Thus, the detent lever 28 rides over an end 36 of the fork bolt 22 and engages a latch shoulder 38 of the fork bolt 22 when the fork bolt 22 is moved to the closed position by closing the trunk lid 20.

The detent lever 28 has an upper arm 40 and a catch 42 attached to a lower arm 44. The upper arm 40 cooperates with a rotary cam 46 that is operated by a conventional key lock cylinder (not shown) to move the detent lever 28 to the release position allowing the trunk lid 20 to open. The catch 42 is also used to move detent lever 28 to the release position as explained below.

The catch 42 is attached to core wire 48 of the pull cable 16 by a slotted cleat 50 at one end. The cleat 50 is slotted to provide a lost motion connection so that the detent lever 28 and the catch 42 can be cycled without moving the core wire 48. The core wire 48 is attached to the release mechanism 12 at the opposite end so that the latch mechanism 14 can be unlatched from inside the trunk. The release mechanism 12 includes a housing 52 that is attached to the interior side of trunk lid 20. A handle 54 is pivotally attached to the housing 52 by a pin that extends through the housing and attaches the handle 54 to a lever 56 inside the housing 52. The core wire 48 is attached to the end of the lever 56. A coil spring, not shown, inside the housing 52 biases the handle 54 and the lever 56 to the latch position.

The handle 54 is coated with a phosphorescent material 57 to allow the handle to be viewed within a darkened trunk. The phosphorescent material is excited or made to glow by external light conducted through light-conducting means. The light-conducting means extends between a location external to the vehicle and a point adjacent the handle. The handle glows for a period of time following exposure to external light entering the conducting means to allow visibility of the handle within a darkened trunk. The sun, streetlights or following headlamps, may provide the external light.

Figure 2:
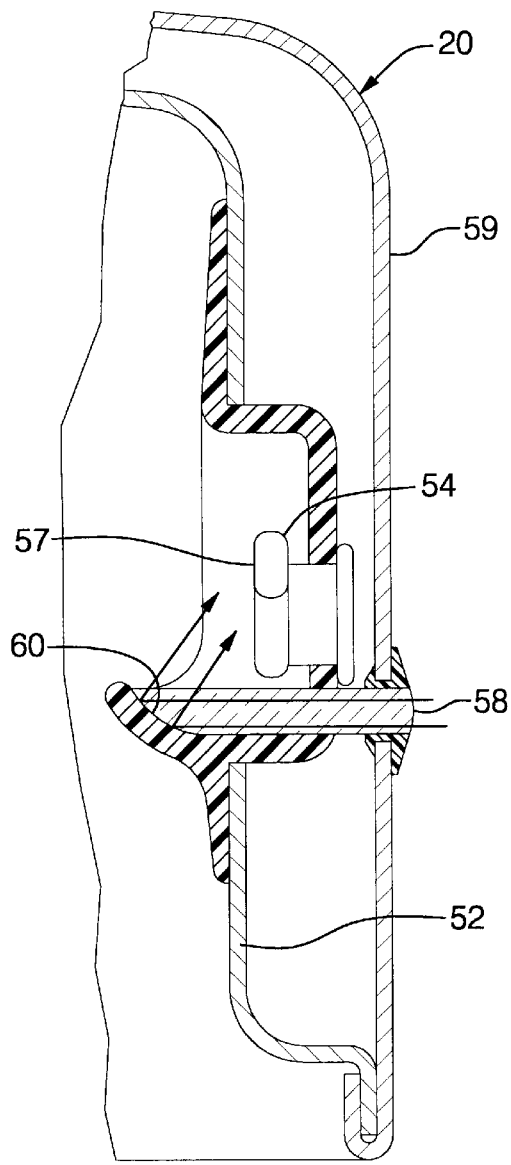
FIG. 2 is a cross-sectional view from the line 2—2 of FIG. 1 a window to illuminate the release handle.

Referring to FIG. 2, the light-conducting means may include a window 58 disposed within a trunk wall such as the rear wall 59 of the trunk lid 20. The window 58 is located in the trunk lid 20 adjacent the back of the handle 54 so that the external light passes through the window and shines directly on the phosphorescent material 57. Alternatively, the light may be reflected from a reflecting surface 60 to shine on the inner side of the handle 54 for better visibility when excited. The window may have a circular or a rectangular shape. The window may be made from a glass or a plastic material. The glass or plastic material transmits light within the blue part of the visible spectrum. Ideally, the glass or plastic material transmits light having a wavelength including the range from 200–450 nanometers. The size of the exposed glass or plastic area is at least one square centimeter.

Figure 3:
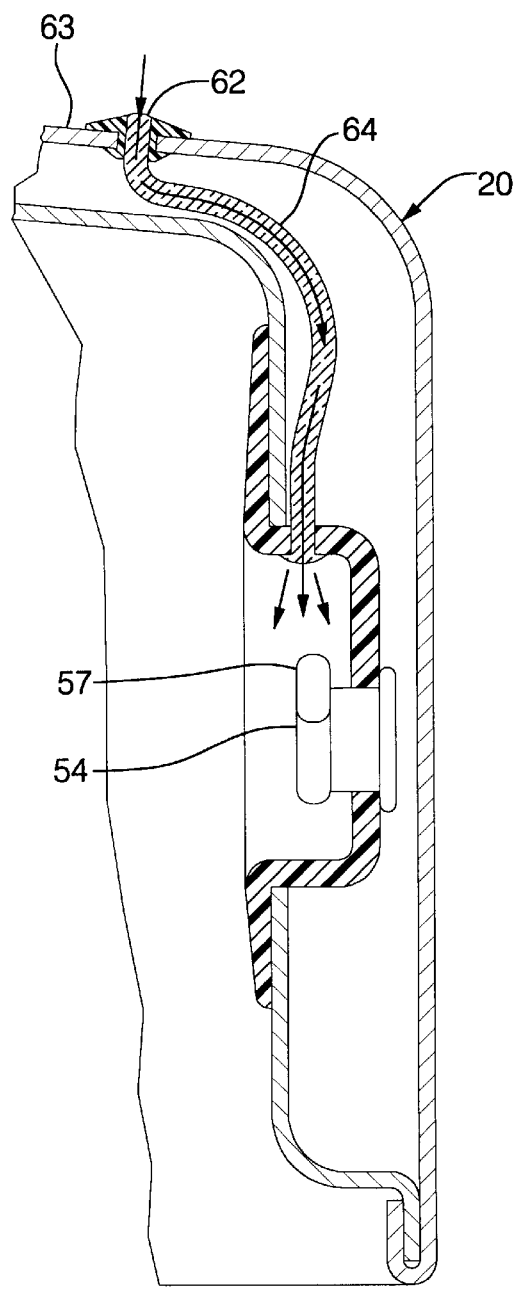
FIG. 3 is a cross-sectional view similar to FIG. 2 showing an alternative embodiment with a light pipe.

In an alternative embodiment of FIG. 3, a window 62 in an upper wall 63 of the trunk lid 20 sends light through a light pipe 64 to shine on the release handle 54. The phosphorescent material 57 may cover the entire handle 54 or it may be applied only to a selected portion of the handle.

Figure 4:
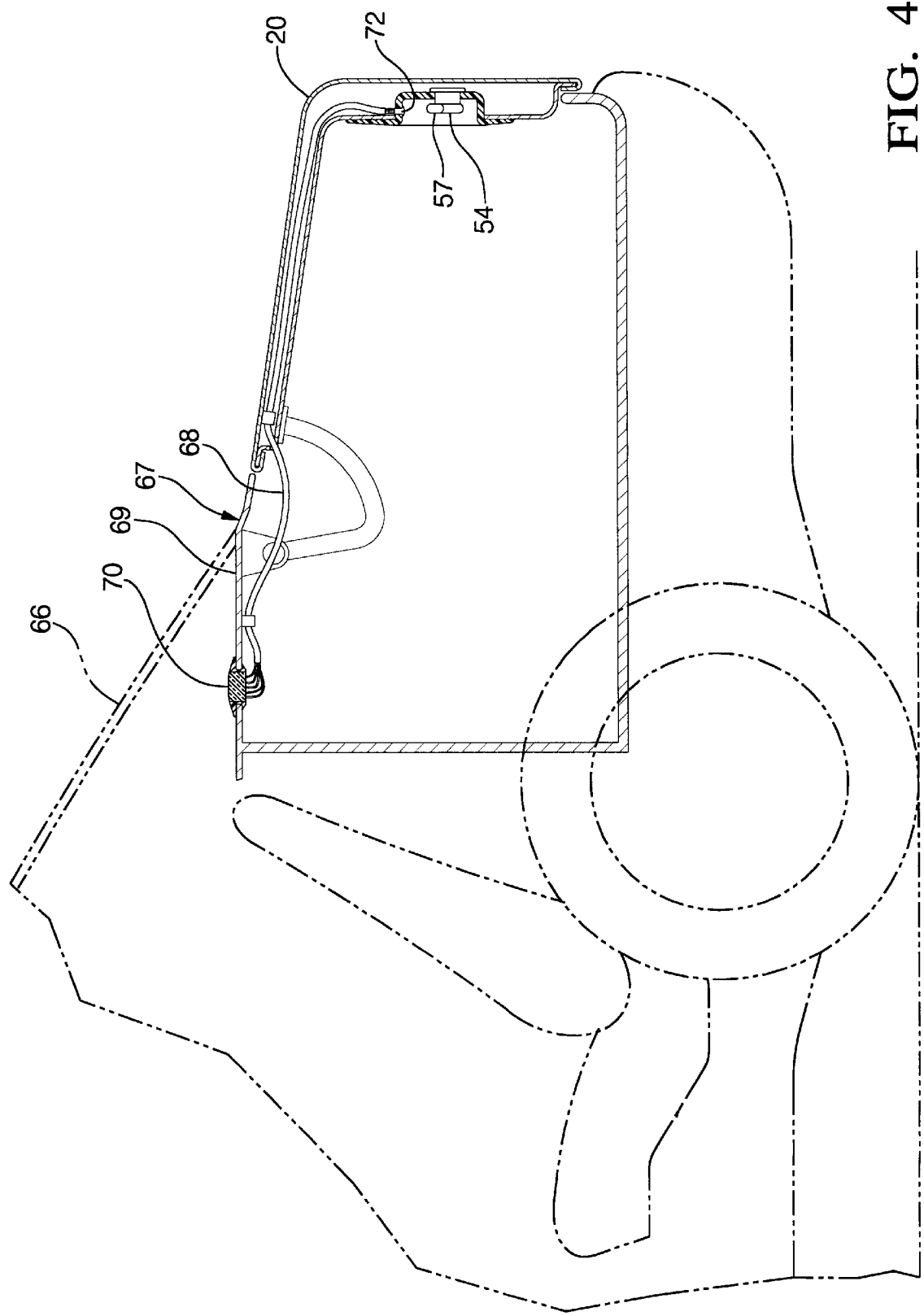
FIG. 4 is a cross-sectional view through the trunk and rear compartment of an automobile showing another embodiment involving remote illumination through the rear window.

In another embodiment of the present invention shown in FIG. 4, the light-conducting means may include a window, such as an existing back window 66 of an automobile 67, and a light pipe or fiber bundle 68 extending from a rear shelf 69 adjacent the window 66 to a point adjacent the handle 54 to conduct external light from the window to the phosphorescent material 57. Any of the other existing windows in the automobile, such as one of the side windows, may be used. The light shines in the back window 66 and enters one end 70 of the fiber bundle and travels through the bundle to another end 72 adjacent the handle 54. The light exits the fiber bundle 68 at the end 72 and shines on the phosphorescent material 57 to excite it or make it to glow. By adding a window to the vehicle or using an existing window of the vehicle to allow external light to excite the phosphorescent material, the handle is visible within a darkened trunk without having to open the trunk lid or provide electrical power.

The phosphorescent material 57 contains at least two different types of phosphors. One of the phosphorescent materials should have a long decay time, such as does alkaline-earth oxide aluminate material. This type of material provides a more lasting glow than a material based on zinc sulfide. For example, if the vehicle is left outside for more than one hour during daylight, the handle may glow for over 24 hours. The different types of phosphor may be combined to form a certain pattern when it is excited that encourages children to reach for the handle, for example, the shape 74 of an ice cream cone as shown in FIG. 1.

While the invention has been described by reference to certain preferred embodiments, it should be understood that numerous changes could be made within the spirit and scope of the inventive concepts described. Accordingly, it is intended that the invention not be limited to the disclosed embodiments, but that it have the full scope permitted by the language of the following claims.

What is claimed is:

1. Phosphorescent release mechanism for releasing latch means for a trunk lid of a vehicle from within the trunk, the mechanism including a release handle coated with a phosphorescent material to allow the handle to be viewed within a darkened trunk and light-conducting means disposed between a location external to the vehicle and a point adjacent the handle to conduct external light to the handle for exciting the phosphorescent material to glow in the dark for a period of time following exposure to the external light passing through the light-conducting means.

2. A mechanism as in claim 1 wherein the light-conducting means includes a window disposed within a trunk wall and located such that external light passes through the window and illuminates the phosphorescent material of the handle.

3. A mechanism as in claim 2 wherein the trunk wall is the trunk lid.

4. A mechanism as in claim 2 wherein the window has an area of at least one square centimeter.

5. A mechanism as in claim 2 wherein the window is made from one of a glass and a plastic material that transmits light within a blue part of the visible spectrum.

6. A mechanism as in claim 2 wherein the window is made from one of a glass and a plastic material that transmits light having a wavelength including the range of 200–450 nanometers.

7. A mechanism as in claim 1 wherein the light-conducting means includes a window disposed within a vehicle wall and a light pipe extending between the window and a point adjacent the handle to conduct the external light from the window to the phosphorescent material of the handle.

8. A mechanism as in claim 7 wherein the window is an existing window of the vehicle.

9. A mechanism as in claim 1 wherein the light-conducting means includes a window disposed within a vehicle wall and a fiber bundle extending between the window and a point adjacent the handle to conduct the external light from the window to the phosphorescent material of the handle.

10. A mechanism as in claim 9 wherein the window is an existing window of the vehicle.

11. A mechanism as in claim 1 wherein the phosphorescent material includes one having a long decay period.

12. A mechanism as in claim 11 wherein the phosphorescent material having a long decay period is an alkaline-earth oxide aluminate.

13. A mechanism as in claim 1 wherein the phosphorescent material contains more than one type of phosphor and the different types of phosphors are combined such that a predetermined pattern is visible when the phosphors are excited.

* * * * *